Oct. 30, 1962  G. K. WEISSE ET AL  3,061,642
PREPARATION OF DIHYDRAZIDES OF DICARBOXYLIC ACIDS
Filed Dec. 30, 1958
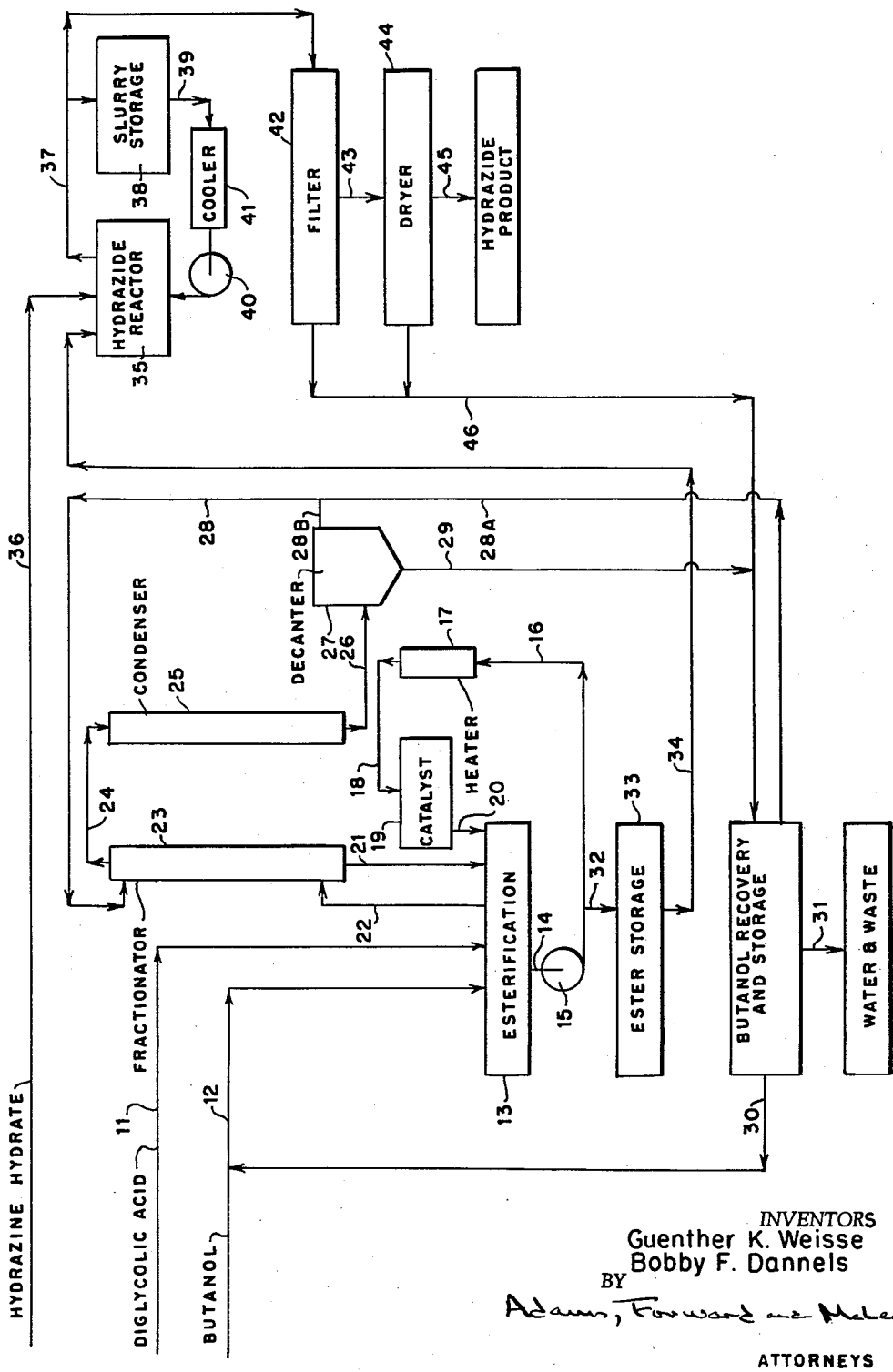
INVENTORS
Guenther K. Weisse
Bobby F. Dannels
BY
Adams, Forward and McLean
ATTORNEYS

United States Patent Office 3,061,642
Patented Oct. 30, 1962

3,061,642
PREPARATION OF DIHYDRAZIDES OF DICARBOXYLIC ACIDS
Guenter Karl Weisse, Grand Island, and Bobby F. Dannels, Tonawanda, N.Y., assignors to Olin Mathieson Chemical Corporation, a corporation of Virginia
Filed Dec. 30, 1958, Ser. No. 783,762
14 Claims. (Cl. 260—561)

This invention relates to improvements in the manufacture of dihydrazides having the formula $$NH_2NHCO(CH_2)_nX(CH_2)_mCONHNH_2$$

wherein $n$ and $m$ are integers from one to two and X is —O—, —S— or —$CH_2$—.

The process of the present invention as applied to the manufacture of diglycolic acid dihydrazide, for example, comprises as its principal steps the two reactions represented by the following equations:

$$O(CH_2CO_2H)_2 + 2C_4H_9OH \rightarrow O(CH_2CO_2C_4H_9)_2 + 2H_2O \quad (1)$$

$$O(CH_2CO_2C_4H_9)_2 + 2N_2H_4 \rightarrow O(CH_2CONHNH_2)_2 + 2C_4H_9OH \quad (2)$$

Suitable dicarboxylic acids which can be used as starting material are those of the formula $$HOOC(CH_2)_nX(CH_2)_mCOOH$$

where $m$, $n$ and X are as defined above. Examples of suitable dicarboxylic acids include diglycolic acid, adipic acid, pimelic acid, glutaric acid, thiodiglycolic acid and thiodipropionic acid. In the first step the appropriate dicarboxylic acid is esterified by an excess of n-butanol to form the dibutyl ester in solution in butanol. The resulting dibutyl ester in butanol solution is converted by means of hydrazine to the dihydrazide and butanol is recovered.

Various conventional processes for esterification in the first step and hydrazide formation in the second step have been investigated but have failed to yield dihydrazide suitable for use in the processes of pending applications Serial Numbers 731,146 and 731,147, filed April 28, 1958, of R. L. Holbrook and R. L. Doerr. In these processes the dihydrazide is reacted with formaldehyde in aqueous solution, and the resulting solution is padded onto a cellulosic textile and cured. The resulting textile is creaseproofed to a high degree, it is durable to washing and is non-chlorine retentive when bleached. For optimum final results in this textile treating process the dihydrazide should not be grossly contaminated and should meet certain standards of purity to give the most satisfactory results. For example, standards for diglycolic dihydrazide are as follows:

(1) The product should be a white, free-flowing powder. Off-color products contain impurities which deleteriously darken the treated textile.

(2) The melting point should lie between 160 and 167° C. Lower melting products contain impurities which deleteriously affect color and tensile strength of the treated textile.

(3) The pH of a 5 percent aqueous solution should be between 6.7 and 8.4. Greater acidity indicates the presence of substances which cause degradation of tensile strength and durability of the treated textile.

(4) Hydrazine in other forms than dihydrazide, for example, dihydrazinium salt should be no greater than 1.5 percent by weight as determined by titration of a 5 percent aqueous solution of the product to pH 9 using 0.1 N sodium hydroxide. The presence of more than about 1.5 percent by weight of dihydrazinium salt in the hydrazide product leads to treated textiles of low crease resistance and poor durability with respect to washing.

(5) Ester content should not be greater than 0.5 percent by weight determined by infra-red analysis in order not to reduce the hydrazide content and to provide a clear solution in water.

(6) A 5 percent aqueous solution of the product, adjusted to pH 9 with sodium hydroxide should have an APHA color no greater than 65. On acidification of the alkaline solution to pH 4 with sulfuric acid, no blue or violet color should develop. Colored substances developed in this test indicate that yellowing of the textile may occur on treatment with the methylol condensate.

(7) The product should be free of butanol odor.

When diglycolic dihydrazide meeting the above requirements or other dihydrazides of equivalent purity are used in the processes of the above-identified pending patent applications, the treated cloth which results has a particularly high crease angle, above about 120°, and a whiteness measured by the General Electric Reflectometer within about 5 units of that of the original untreated cloth. The treated cloth shows less than 10 percent loss of tensile strength in the scorch test described in the pending patent applications. When the dihydrazide falls below any of the minimum standards set forth above, such optimum results are not obtained in the finished textile and a product is obtained which is less than satisfactory in color, creaseproofing, durability or other respects.

In the process of the present invention, acidic ion exchange catalysts are used in the esterification step. The use of a conventional sulfuric acid esterification catalyst is unsatisfactory or disadvantageous. Sulfuric acid as catalyst yields hydrazide products which develop blue or violet coloration when a 5 percent aqueous solution is made alkaline and then acidified. Such hydrazide products, when used in the processes of the above-identified applications, result in treated textiles which are unsatisfactorily darkened in padding and curing.

In order to meet the specifications on dihydrazide product which lead to optimum results in the treated textile, several critical factors in the esterification and hydrazide formation steps are required. In the esterification step, the use of acidic ion exchange materials rather than sulfuric acid as catalysts is essential. Suitable acidic ion exchange resins for this purpose are, for example, the sulfonated coal type resins, such as "Zeo-Karb" made by the Permutit Company; the sulfonated phenol-formaldehyde resins, such as "Amberlite IR-120H" manufactured by Rohm and Haas and "Duolite" made by the Chemical Process Company; and sulfonated polystyrene type resins such as "Dowex 50" made by Dow Chemical Company. In addition to resins having a sulfonic polar group, acidic cation exchange resins such as those having carboxylic, phenolic or phosphonic polar groups are also suitable. The acidic cation exchange resins are very stable and are able to convert large quantities of reactants. Inorganic ion exchange materials, usually acid silicate clays, for example, zeolites, greensand and kaolinite, in their acid treated forms, are also suitable for use as catalysts. These can be natural or synthetic, the latter prepared, for example as described in British Patent 451,733. Houdry Catalyst S-90, a synthetic silica-alumina catalyst, is also suitable.

The ion exchange resin is placed in contact with the mixture of acid and excess butanol and the mixture is heated to reflux temperature, e.g., about 100 to 140° C. and preferably 100 to 130° C., for several hours, removing water as an azeotrope with butanol until at least 99 percent of the acid is esterified. The catalyst is removed, for example, by filtration and the ester dissolved in excess butanol is obtained as the product of the first step. Operating in this way it is possible to produce ester which on conversion to the hydrazide will meet the above specifications, particularly with respect to melting point of the product, pH of the aqueous solution, salt content, ester content and color. These specifications cannot be met using sulfuric acid, particularly with respect to color.

The molar proportion of butanol to acid used in the esterification step is preferably about 5:1 to 6:1 in order to provide two moles of butanol to one of acid for the reaction to form the dibasic ester, and to provide ample excess to drive the reaction and to remove water as an azeotrope. More than about 10:1 unnecessarily overloads the recovery system without providing any other advantage and lowers the boiling point of the reaction mixture. This slows the reaction and makes water removal slower. Less than about 4:1 results in higher temperatures in the reaction mixture and causes undesirable darkening of the product.

It is particularly advantageous in the present process to produce the ester in solution in excess butanol and to utilize the ester in butanol in the hydrazide forming second step. The excess of butanol in the first step (1) removes water produced in the reactions, (2) accelerates the reaction rate and (3) does not require separation of the ester from the excess butanol. It is especially advantageous to utilize the butanol solution of the ester in the second step since (1) it provides a bulk of material useful in transferring heat from the reactants to the cooling surfaces, (2) it provides a medium in which the hydrazide forms a slurry which can be pumped and otherwise handled, (3) it has such a low solvent effect on the hydrazide that the latter precipitates substantially completely and (4) it has such a high solvent power for the ester that the excess of the latter is readily removed from the precipitated hydrazide, for example, by washing with butanol.

In the hydrazide forming reaction it is necessary to use a small excess of ester compared with hydrazine in order to obtain a good yield from the hydrazine. Usually about 1 to 5 percent of excess ester calculated on the basis of Equation 2 above is suitable. This amounts to the use of 1.90 to 1.98 moles of hydrazine per mole of ester, or 1.01 to 1.05 moles of ester per 2 moles of hydrazine. With diglycolic ester, the hydrazide forming reaction is exothermic and is carried out with suitable cooling to keep the reaction under control. After maintaining the reaction mixture at a suitable temperature, preferably about 50 to 70° C. for several hours, the hydrazine is substantially completely converted and excellent yields are obtained. With adipic acid ester, heating is required to maintain the preferred temperature range in the hydrazide-forming reaction. Operating in this way, no free residual hydrazine remains in the reaction mixture and hence it cannot contaminate the subsequent steps of solvent recovery. The use of materials of construction resistant to hydrozine is avoided and ordinary equipment is suitable.

It might be expected that the use of less than the stoichiometric proportion of hydrazine based on the ester would result in only partial conversion to hydrazide. Surprisingly, however, the second ester group, in the case of diglycolic esters, reacts at a rate about three times that of the first ester group. This makes the use of excess ester feasible without any danger of forming any half ester-half hydrazide intermediate.

The hydrazide forming reaction can be carried out at other temperatures between room temperature and about 100° C. However, maintaining the temperature within the limits of 50–70° C. results in a hydrazide product which is most easily filtered. Outside these limits the hydrazide product which is substantially insoluble in butanol separates as a fine precipitate which is difficult to filter.

Anhydrous hydrazine can be used in the hydrazide forming reaction but aqueous hydrazine is cheaper and equally effective provided the aqueous hydrazine charged contains about 50 percent or more by weight of $N_2H_4$. Hydrazine hydrate or aqueous hydrazine approximating that composition is especially suitable since it is readily available and less expensive than more concentrated hydrazine.

Although the prior art has taught the necessity of using an excess of hydrazine in the preparation of hydrazides in order to avoid the formation of bis-hydrazides (in which each nitrogen atom carries an acyl group, RCONHNHCOR), the process of the present invention is based in part on the discovery that in the manufacture of dihydrazides, an excess of ester can be used with no appreciable formation of bis-hydrazide or other by-products. Several advantages accrue to this reversal of prior art teachings.

The hydrazine charged is substantially completely converted to the desired dihydrazide which is economically advantageous since hydrazine in this case is the more costly reagent. It is further advantageous in that processing equipment in subsequent operations need not be resistant to the action of free hydrazine. Hazards due to contact of hydrazine with metals are avoided. The excess of ester is readily recoverable for recycle but, since only a slight excess, about 1 to 5 percent, is necessary to insure complete utilization of the hydrazine, it is usually economically unjustified to recover the excess ester. This discovery is the basis for the further advantage that the alcohol recovery system is greatly simplified. The dihydrazide is substantially insoluble in butanol and, by carrying out the hydrazide forming reaction at temperatures between about 50 and 70° C., is obtained in readily filterable form, resulting in a filtrate containing substantially no dihydrazide. The filter cake may be washed with butanol and dried to obtain a very pure dihydrazide.

The process of the present invention thus comprises esterifying a dibasic acid of the above formula with an excess of n-butanol in the presence of an acidic ion exchange catalyst, with removal of water of esterification until at least about 99% of the acid has been esterified to provide a first reaction mixture comprising a mixture of the catalyst, di-n-butyl ester of the acid and n-butanol, separating the catalyst from the first reaction mixture, admixing the remainder of the first reaction mixture with hydrazine in an amount sufficient to provide a small stoichiometric excess of di-n-butyl ester over hydrazine whereby the ester and hydrazine react and a second reaction mixture is formed containing the dihydrazide of the dibasic acid, and separating the dihydrazide from the second reaction mixture.

The process of the invention will be further illustrated by reference to the accompanying drawing which is a flow diagram describing a batch method of practicing the process of the present invention using diglycolic acid.

In the drawing, diglycolic acid is introduced via line 11 and a mixture of fresh and recovered butanol is charged via line 12 into esterification vessel 13, which is preferably jacketed. The reaction mixture is removed via line 14 by pump 15 and transferred via line 16 through heater 17 and line 18 through chamber 19 containing the catalyst, returning via line 20 to esterification vessel 13. The heat supplied serves to vaporize a portion of the reaction mixture and the vapors pass via line 22 to fractionating column 23. Bottoms from the fractionating column 23 are returned via line 21 to the esterification vessel 13. A mixture of butanol and water is removed overhead from fractionating column 23 via line 24 through condenser 25. The liquid phases are transferred via line 26 to decanter 27. Separated supernatant butanol is removed from decanter 27 and returned as reflux via line 28B and 28 to fractionating tower 23 as long as a water phase separates in decanter 27. During this period the lower aqueous layer containing some butanol is removed from decanter 27 via line 29 and charged to the butanol recovery and storage system. Wate and waste removed in the butanol recovery operation is discharged via line 31. When the reaction approaches completion and no water phase separates in decanter 27 line 28B is closed and all the condensate is charged via line 29 to the butanol recovery system to be dried. Dried butanol is charged via lines 28A and 28 to column 23 until the reaction is completed. The esterification vessel 13 is emptied via lines 14 and 32 to intermediate ester storage 33.

Hydrazide reactor 35 is charged with hydrazine hydrate via line 36 and alcoholic ester is removed from storage 33 and added gradually via line 34 to reactor 35. As the reaction proceeds, diglycolic acid hydrazide separates and the slurry is transferred via line 37 to slurry storage tank 38. Recycle line 39 and pump 40 maintain the slurry in suspension and recirculate it between hydrazide reactor 35 and slurry storage 38. A cooler 41 is provided in line 39 to remove the exothermic heat of reaction. When preparing adipic dihydrazide the cooler 41 is used as a heater. When the reaction is complete the slurry in hydrazide reactor 35 and slurry storage 38 is transferred via line 37 to filter 42 where the dihydrazide product is separated from the liquor. The solid product is transferred by line 43 to dryer 44. After drying the hydrazide product is transferred via line 45 to storage and use. Filtrate from filter 42 and condensed butanol vapors from dryer 44 are combined in line 46 and transferred to the butanol recovery and storage system where butanol is recovered and purified. Water and waste are discharged via line 31.

The invention will be further illustrated by reference to the following examples.

*Example 1*

In a typical operation carried out substantially by the steps shown in the drawing, the esterification vessel was charged with 1625 pounds of diglycolic acid and 3900 pounds of butanol comprising a mixture of fresh and recovered butanol. The catalyst chamber was charged with 50 pounds of "IR–120H" ion exchange resin and the esterification mixture was cycled by means of a pump through a heater and through the catalyst chamber back to the esterification vessel. During this operation of about 12 hours, a temperature of 100 to 130° C. was maintained in the esterification vessel. The distillate was fractionated and condensed, returning bottoms from the fractionator to the esterification chamber. Initially the distillate separated into a butanol phase and an aqueous phase. The butanol phase was returned as reflux to the fractionator until the distillate consisted of a single butanol phase. During this time the aqueous phase, saturated with butanol was returned to the recovery unit. When no more water separated in the decanter, anhydrous recovered butanol was refluxed to the column and distillate butanol was sent to the recovery system. After 12 hours the reaction was substantially complete and 4866 pounds of ester product, containing excess butanol, were removed to storage.

The hydrazide reactor was charged with 1190 pounds of 64 percent aqueous hydrazine solution and 4866 pounds of ester product (2.5 percent excess ester) was introduced. Cooling and agitation were supplied to maintain the mixture at 50 to 65° for a total time of 4 hours. The resulting slurry was charged to the filter. The cake was washed with butanol to produce 2640 pounds of wet cake which was charged to the dryer. After removing the butanol and minor amounts of water in the dryer, the product amounted to 1850 pounds of diglycolic dihydrazide. Butanol removed from the decanter was combined with wash butanol and filtrate from the hydrazide filter and dried by distilling overhead an azeotrope of butanol and water. The bottoms were distilled to remove dry butanol overhead and higher boiling contaminants as bottoms. The latter were discharged and the recovered purified butanol was stored for re-use in the esterification operation.

*Example 2*

In a continuous operation for producing diglycolic dihydrazide, a solution of dibutyl diglycolate in excess butanol, prepared batchwise as described in Example 1, is charged to a pump at a rate providing 540 pounds per hour of equivalent diglycolic acid. Simultaneously 64% aqueous hydrazine is charged to the pump at a rate providing 254 pounds per hour of $N_2H_4$. The pump also picks up slurry from an agitated surge tank and discharges the mixed stream through a cooled reactor to the surge tank. The temperature of the slurry is maintained at 50 to 70° C. and the holding time averages 4 hours. The product slurry is continuously drawn from the surge tank and fed to a continuous rotary vacuum filter. The cake is washed with dry butanol and discharged to a continuous hot air dryer. The yield of dried diglycolic dihydrazide amounts to about 820 pounds per hour. The filtrate and washings are combined and continuously dried by distilling butanol-water azeotrope overhead. Bottoms are charged to a second tower and dry butanol, suitable for use in esterification and product washing, is continuously distilled overhead. Non-volatile bottoms are discarded.

*Example 3*

A mixture of 268 parts by weight of diglycolic acid, 592 parts by weight of n-butanol and 25 parts by weight of a commercial synthetic silica-alumina ion-exchange catalyst (Houdry catalyst S–90) was refluxed for about 9 hours. A total of 67 parts by weight of water was separated, returning the condensed butanol to the esterification vessel. The pot temperature gradually rose to 130° C. and the vapor temperature to 117° C. The catalyst was removed by filtration and the resulting butanol solution of dibutyl diglycolate was suitable for conversion of the ester to hydrazide.

A solution of 4 moles of dibutyl diglycolate in 8 moles of excess butanol was added during 20 minutes to 7.84 moles of hydrazine hydrate, stirring and maintaining a temperature of 30° C. to 36° C. for an additional 3 hours. The hydrazide product was separated by filtration. After drying, it melted at 161–163.4° C. The yield of diglycolic dihydrazide was 95 percent based on the ester and 97 percent based on the hydrazine.

*Example 4*

A mixture of 68 parts by weight of thiodiglycolic acid, 135 parts by weight of n-butanol and 3.4 parts by weight of Amberlite IR–120H resin was refluxed for two hours taking overhead a mixture of butanol and water and adding fresh butanol to replace that distilled out. The vapor temperature gradually rose to 114° C. and the pot temperature to 131° C. A total of 14 parts by weight of water was separated from the overhead. The catalyst was separated by filtration and the resulting solution of dibutyl thiodiglycolate in butanol converted to hydrazide as described in the preceding examples.

*Example 5*

A mixture of 100 parts by weight of thiodipropionic acid, $S(CH_2CH_2CO_2H)_2$, 166 parts by weight of n-butanol and 5 parts by weight of Amberlite IR–120H resin was refluxed removing a mixture of butanol and water overhead. Fresh butanol was added to replace that removed by distillation. The distillation was continued until the vapor temperature reached 114° C. A total of 18 parts by weight of water was separated from the overhead. The catalyst was removed by filtration and the resulting butanol solution of dibutyl thiodipropionate converted to the dihydrazide as described in the preceding examples.

*Example 6*

A mixture of 8 gram moles of adipic acid, 32 gram moles of n-butanol and 60 grams of Amberlite IR–120H resin was refluxed for 430 minutes removing overhead a mixture of butanol and water. Fresh butanol was added continuously to replace that distilled out. When the vapor temperature reached 117° C. and the pot temperature was 140° C., the distillation was discontinued. The catalyst was removed by filtration and the resulting butanol solution of dibutyl adipate converted to the dihydrazide as described in the preceding examples.

What is claimed is:

1. In the manufacture of dihydrazides of dibasic acids, the steps of esterifying a dibasic acid, of the formula $HOOC(CH_2)_nX(CH_2)_mCOOH$ wherein X is selected from the group consisting of oxygen, sulfur and methylene and *n* and *m* are integers of from 1 to 2, with n-butanol by contacting the acid and n-butanol in the presence of a substantial stoichiometric excess of n-butanol and an acidic ion exchange catalyst with removal of water of esterification as an azeotrope of water and n-butanol from the reaction mixture until at least about 99% of the acid has been esterified to provide a first reaction mixture consisting essentially of a mixture of the catalyst, di-n-butyl ester of the acid and n-butanol, separating the catalyst from the first reaction mixture, admixing the remainder of the first reaction mixture with hydrazine in an amount sufficient to provide a small stoichiometric excess of di-n-butyl ester over hydrazine whereby the ester and hydrazine react and a second reaction mixture containing the dihydrazide of the dibasic acid is formed, and separating the dihydrazide from the second reaction mixture.

2. The method of claim 1 in which in the esterification step the proportion of n-butanol to acid is about 4 to 10 moles of n-butanol to 1 mole of acid and the temperature is maintained at reflux temperature and in the hydrazide forming step the proportion of hydrazine to ester is from 1.90 to 1.98 moles of hydrazine per mole of ester and the temperature is maintained between room temperature and about 100° C.

3. The method of claim 2 in which the catalyst is sulfonated phenol-formaldehyde resin.

4. The method of claim 2 in which the catalyst is synthetic silica-alumina ion exchange catalyst.

5. The method of claim 1 in which in the esterification step the proportion of n-butanol to acid is about 5 to 6 moles of n-butanol to 1 mole of acid and the temperature is maintained at about 100 to 140° C. and in the hydrazide forming step the proportion of hydrazine to ester is from 1.90 to 1.98 moles of hydrazine per mole of ester and the temperature is maintained at about 50 to 70° C.

6. The method of claim 5 in which the catalyst is sulfonated phenol-formaldehyde resin.

7. The method of claim 5 in which the catalyst is synthetic silica-alumina ion exchange catalyst.

8. In the manufacture of diglycolic acid dihydrazide, the steps of esterifying diglycolic acid with n-butanol by contacting the acid and n-butanol in the presence of a substantial stoichiometric excess of n-butanol and an acidic ion exchange catalyst with removal of water of esterification as an azeotrope of water and n-butanol from the reaction mixture until at least about 99% of the diglycolic acid has been esterified to provide a first reaction mixture consisting essentially of a mixture of the catalyst, di-n-butyl ester of diglycolic acid and n-butanol, separating the catalyst from the first reaction mixture, admixing the remainder of the first reaction mixture with hydrazine in an amount sufficient to provide a small stoichiometric excess of the di-n-butyl ester over hydrazine whereby the ester and hydrazine react and a second reaction mixture containing diglycolic acid dihydrazide is formed, and separating the diglycolic acid dihydrazide from the second reaction mixture.

9. The method of claim 8 in which in the esterification step the proportion of n-butanol to acid is about 4 to 10 moles of n-butanol to 1 mole of acid and the temperature is maintained at reflux temperature and in the hydrazide forming step the proportion of hydrazine to ester is from 1.90 to 1.98 moles of hydrazine per mole of ester and the temperature is maintained between room temperature and about 100° C.

10. The method of claim 8 in which in the esterification step the proportion of n-butanol to acid is about 5 to 6 moles of n-butanol to 1 mole of acid and the temperature is maintained at about 100 to 140° C. and in the hydrazide forming step the proportion of hydrazine to ester is from 1.90 to 1.98 moles of hydrazine per mole of ester and the temperature is maintained at about 50 to 70° C.

11. The method of claim 9 in which the catalyst is synthetic silica-alumina ion exchange catalyst.

12. The method of claim 10 in which the catalyst is synthetic silica-alumina ion exchange catalyst.

13. The method of claim 9 in which the catalyst is sulfonated phenol-formaldehyde resin.

14. The method of claim 10 in which the catalyst is sulfonated phenol-formaldehyde resin.

References Cited in the file of this patent

Curtius: J. Prakt. Chem., 2nd Series, vol. 91 (1915), pp. 4–5; 16–17.

Borsche et al.: Annalen der Chemie, vol. 475 (1929), pp. 122–123.

Sussman: Ind. and Eng. Chemistry, vol. 38, No. 12 (1946), pp. 1228–1230.

Astle: Ion Exchangers in Organic and Biochemistry, pages 658–659; 663–668 (1957).